United States Patent
Hulsebus

(10) Patent No.: US 6,477,890 B1
(45) Date of Patent: Nov. 12, 2002

(54) SMOKE-PRODUCING APPARATUS FOR DETECTING LEAKS

(75) Inventor: Jon L. Hulsebus, Grandville, MI (US)

(73) Assignee: K-Line Industries, Inc., Holland, MI (US)

( * ) Notice: Subject to any disclaimer, the term of this patent is extended or adjusted under 35 U.S.C. 154(b) by 18 days.

(21) Appl. No.: 09/662,914

(22) Filed: Sep. 15, 2000

(51) Int. Cl.$^7$ .......................... G01M 3/04; G01M 3/20; H05B 1/00

(52) U.S. Cl. .................. 73/40.7; 73/49.7; 239/136; 392/394; 392/396; 392/397

(58) Field of Search ................. 73/40.7, 49.7; 102/334; 122/40; 239/136; 392/386, 394, 396, 397, 399

(56) References Cited

U.S. PATENT DOCUMENTS

| | | |
|---|---|---|
| 1,561,276 A | 11/1925 | Pankratz |
| 1,882,318 A | 10/1932 | Curioni |
| 2,003,979 A | 6/1935 | Škorić |
| 2,070,038 A | 2/1937 | Batt |
| 2,850,615 A | 9/1958 | Luse, Jr. et al. |
| 2,882,240 A | 4/1959 | Charwat |
| 2,930,511 A | 3/1960 | Vanerstrom |
| 3,002,237 A | 10/1961 | Spexarth |
| 3,087,327 A | 4/1963 | Kägi |
| 3,093,596 A | 6/1963 | Cone |
| 3,250,723 A | 5/1966 | Fortney |
| 3,392,479 A | 7/1968 | Simmons |
| 3,395,514 A | 8/1968 | Bub |
| 3,432,439 A | 3/1969 | Dickman |
| 3,444,721 A | 5/1969 | Hearn et al. |
| 3,483,735 A | 12/1969 | Packo |
| 3,835,293 A | 9/1974 | McAlister |
| 3,975,943 A | 8/1976 | Brachet |
| 3,990,987 A | 11/1976 | Rogers |
| 4,155,249 A | 5/1979 | Scott |
| 4,198,856 A | 4/1980 | Kaselaan et al. |
| 4,303,397 A | 12/1981 | Swiatosz ............... 434/226 |
| 4,326,119 A | 4/1982 | Swiatosz |
| 4,330,428 A | 5/1982 | Clifford ............... 73/40.7 |
| 4,349,723 A | 9/1982 | Swiatosz ............... 392/399 |
| 4,419,302 A | 12/1983 | Nishino et al. |
| 4,493,211 A | 1/1985 | Weinstein |

(List continued on next page.)

OTHER PUBLICATIONS

Combustion Testing Module, Lennox Education, Module 1204, Sep. 1995.
Heat Exchanger Inspection Module, Lennox Education, Module 12097, Nov. 1994.
Emi–Tech, Inc., Vacutec Test Information. 1995.
Smog Check, Motor Apr., 1996, Sue Hannibal.
Emi–Tech, Inc., Operation Manual, Vacutec, Model 816, The Diesel Technician.

*Primary Examiner*—Daniel S. Larkin
(74) *Attorney, Agent, or Firm*—Price Heneveld Cooper Dewitt & Litton

(57) ABSTRACT

An apparatus for generating smoke includes a closed chamber having a top cover, and a metal air inlet tube, a metal air outlet tube and a metal suction tube extending through the cover. An electric coiled-wire heating element is positioned transversely in the chamber and connected electrically at each end to the metal air inlet tube and the metal suction tube. A spray dispenser is attached to the top cover and positioned over the heating element and is operably connected to a supply of smoke-producing fluid, the dispenser being configured to spread and drop controlled quantities of the smoke-producing fluid onto the heating element. Separate controls are provided for controlling flow of the fluid onto the heating element for controlling smoke production, and for controlling flow of air for carrying smoke through a delivery line for use. An orifice and also a condenser is positioned at an outlet of the smoke-producing chamber to better distribute and control smoke in the air, and to reduce oil droplets and heat in the smoke-carrying air. Variations are provided to show manual, semi-automatic, and automatic apparatus.

27 Claims, 2 Drawing Sheets

U.S. PATENT DOCUMENTS

| | | |
|---|---|---|
| 4,524,607 A | 6/1985 | Pelletier et al. |
| 4,547,656 A | 10/1985 | Swiatosz et al. |
| 4,568,620 A | 2/1986 | Wright et al. |
| 4,646,558 A | 3/1987 | Gaultieri et al. |
| 4,694,695 A | 9/1987 | Sewell et al. |
| 4,764,660 A | 8/1988 | Swiatosz |
| 4,818,843 A | 4/1989 | Swiatosz |
| 4,871,115 A | 10/1989 | Hessey |
| 4,942,920 A | 7/1990 | Chalifoux et al. |
| 4,998,479 A | 3/1991 | Perham et al. |
| 5,078,976 A | 1/1992 | Shibauchi et al. |
| 5,095,647 A | 3/1992 | Zobele et al. |
| 5,107,698 A | 4/1992 | Gilliam .................... 73/40.7 |
| 5,112,442 A | 5/1992 | Goodson |
| 5,168,544 A | 12/1992 | Kolasa |
| 5,182,941 A | 2/1993 | Frenkel et al. |
| 5,220,637 A | 6/1993 | Levin, III et al. |
| 5,335,536 A | 8/1994 | Runnevik |
| 5,367,603 A | 11/1994 | Wenrich et al. |
| 5,507,176 A | 4/1996 | Kammeraad et al. |
| 5,637,788 A | 6/1997 | Remboski et al. |
| 5,753,800 A | 5/1998 | Gilliam .................... 73/40.7 |
| 5,763,764 A | 6/1998 | Mieczkowski et al. |
| 5,803,359 A | 9/1998 | Vandoninck |
| 5,859,363 A | 1/1999 | Gouge .................... 73/40.7 |
| 5,870,524 A | 2/1999 | Swiatosz |
| 5,887,117 A | 3/1999 | Desu et al. |
| 5,898,108 A | 4/1999 | Mieczkowski et al. |
| 5,922,944 A | 7/1999 | Pieroni et al. .............. 73/40.7 |
| 5,937,141 A | 8/1999 | Swiatosz |
| 6,018,615 A | 1/2000 | Loblick .................... 392/397 |

SMOKE-PRODUCING APPARATUS FOR DETECTING LEAKS

BACKGROUND OF THE INVENTION

The present invention relates to smoke-producing apparatus for detecting leaks.

Leak detection by using smoke-carrying air is known. For example, automobile mechanics have, for many years, used smoke-laden air pumped into a closed system, such as a radiator and engine coolant system, to find leaks. However, there is a need for devices that are lower cost, more reliable, non-complex, and that produce a more consistent smoke. Also, devices are needed that are adaptable for different uses, with different equipment and in different environments. In particular with automotive fuel and evaporative emissions testing, a smoke-producing apparatus is needed that does not leave a residue, and that produces a highly uniform and low-particle-size smoke.

Pieroni et al. U.S. Pat. No. 5,922,944 discloses an apparatus for simultaneously producing smoke and airflow. However, sometimes separate or independent control is needed, such as when more or less airflow is needed, or when denser (or less dense) smoke is needed or preferred. Further, there is a need for better control of the smoke during initial start-up of the apparatus and for more uniform smoke concentration, and also for control over fluid droplets going downstream. Also there is a need for remote control so that a mechanic doesn't have to go back to tester unit to control it or to turn it off (or on).

Accordingly, an apparatus is desired having the aforementioned advantages and solving the aforementioned problems.

SUMMARY OF THE PRESENT INVENTION

In one aspect of the present invention, an apparatus for generating smoke includes a closed chamber having an air inlet and an air outlet, an electric heating element positioned transversely in the chamber, and a supply of smoke-producing fluid. A dispenser is positioned over the electric heating element and operably connected to the supply of smoke-producing fluid, the dispenser being configured to spread and drop controlled quantities of the smoke-producing fluid onto the heating element. An air supply is connected to the air inlet, and a conduit is connected to the air outlet for communicating air from the air supply mixed with smoke generated by the heating element in the closed chamber to a location for use.

In another aspect of the present invention, an apparatus for testing for leaks includes a smoke-producing chamber, and a first control for controlling a quantity of smoke generated. An air supply is operably connected to the smoke-producing chamber, and a second control, independent of the first control, is provided for controlling flow of smoke from the smoke-producing chamber.

In another aspect, an apparatus for testing for leaks includes a smoke-producing device having a control for controlling a quantity of smoke generated and dispensed, the control including a receiver for receiving signals and being constructed to turn off the smoke-producing device upon receiving a shutoff signal. A remote control sender is provided and constructed to send the shutoff signal to the receiver.

In yet another aspect, an apparatus for generating smoke includes a closed chamber having a top cover, and an air inlet tube and an air outlet tube extending through the cover, at least one of the tubes being conductive. An electric coiled-wire heating element is positioned transversely in the chamber and operably electrically connected to the at least one conductive tube. A spray dispenser is attached to the top cover and positioned over the heating element and operably connected to a supply of smoke-producing fluid, the dispenser being configured to spread and drop controlled quantities of the smoke-producing fluid onto the heating element.

These and other features, objects, and advantages of the present invention will become apparent to a person of ordinary skill upon reading the following description and claims together with reference to the accompanying drawings.

DETAILED DESCRIPTION OF THE PREFERRED EMBODIMENT

Figure 1:
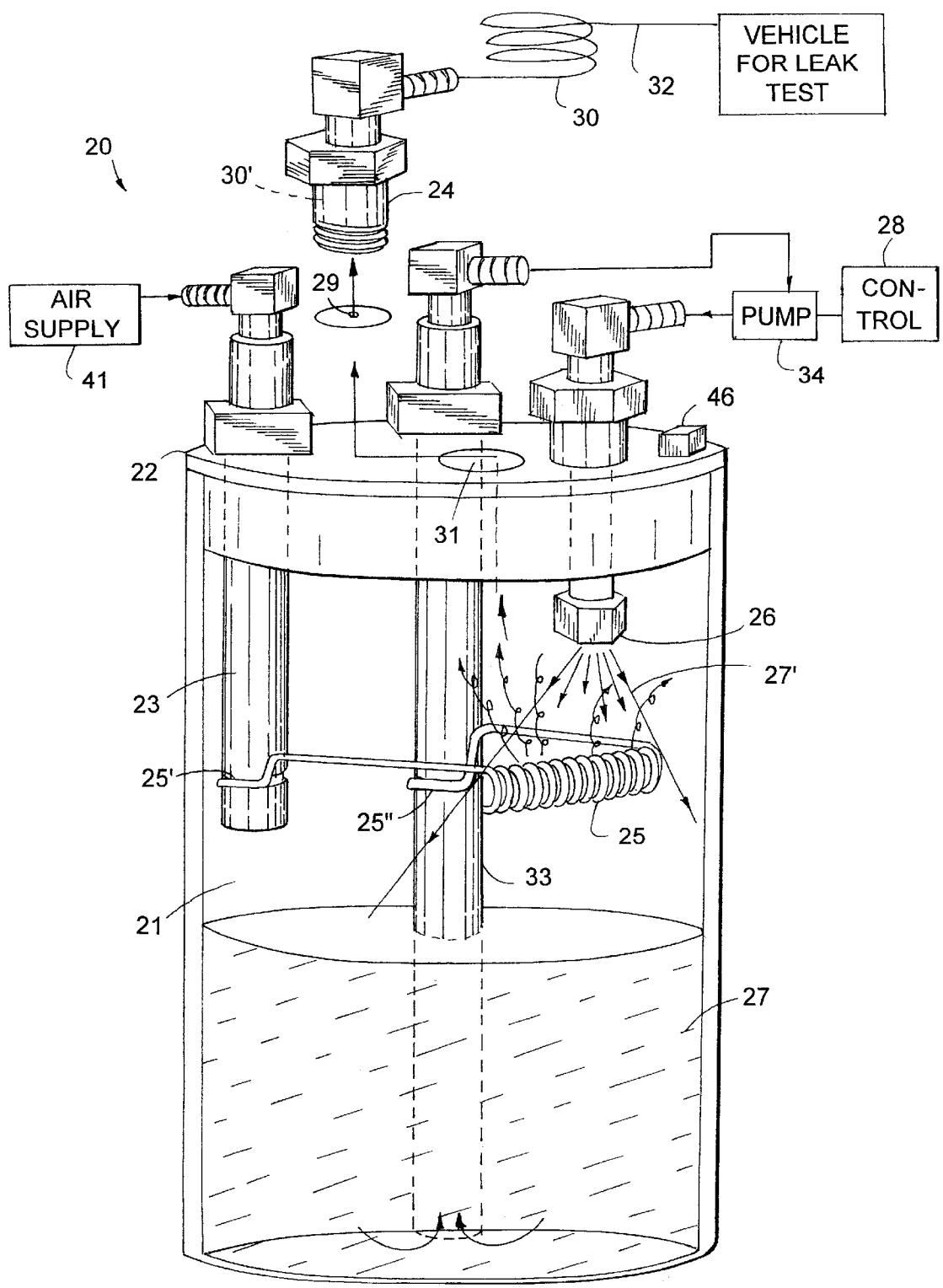
FIG. 1 is a perspective view of a smoke-producing apparatus embodying the present invention, including a smoke-producing chamber and related components.

An apparatus 20 (FIG. 1) for generating smoke includes sidewalls and a bottom defining a closed chamber 21, and a top cover 22 closing the chamber 21. A metal air inlet tube 23, metal air outlet tube 24, and a metal suction tube 33 extend through the cover 22. An electric coiled-wire heating element 25 is positioned transversely in the chamber 21 and connected electrically at each end 25' and 25" to the metal air inlet and suction tubes 23 and 33. A spray dispenser 26 is attached to the-top cover 22 and positioned over the heating element 25 and is operably connected to a supply of smoke-producing fluid 27 contained in a bottom area of the chamber 21. The dispenser 26 is configured to spread and drop controlled quantities 27' of the smoke-producing fluid 27 onto the heating element 25. A control box 28 includes separate controls for controlling flow of the fluid 27 onto the heating element for controlling smoke production, and for controlling flow of air for carrying smoke through a delivery line for use. An orifice 29 and also a condenser 30' (e.g. a coil of piping) is positioned at an outlet 31 of the smoke-producing chamber ahead of the delivery tube 32 to better distribute and control smoke in the air, and to reduce oil droplets and heat in the smoke-carrying air. Variations are provided to show manual, semi-automatic, and automatic apparatus, as discussed below.

The closed chamber 21 and the top cover 22 are preferably made of plastic, although other materials can be used. The top cover 22 includes a lip and is sealingly attached to the chamber 21 to form an airtight enclosure. It is contemplated that a pressure relief valve 46 will be incorporated into the top cover 22 to prevent over-pressurization of the chamber 21, but it should be understood that a pressure relief valve does not have to be used. For example, the top cover 22 can be constructed to break away at a predetermined force, or the sidewalls or bottom of the chamber 21 can be designed to fracture at a predetermined force, or a relief valve separate from the apparatus 20 can be included (e.g. on the air supply 41).

The metal air inlet and outlet tubes 23 and 24 extend through the top cover 22. The outlet tube 24 terminates at the cover 22, but the inlet tube 23 extends to a mid-level in the chamber 21 to assure good mixing of the air and smoke. One of the tubes 23, 24, and 33 are designed so that a dipstick (not specifically shown) can be extended through it into the chamber 21 to determine the level of fluid 27. Fluid can be added through the one tube, or through a separate hole in the top cover 22, or through the air inlet tube 23. The pickup or suction tube 33 extends through the top cover 22 to a bottom of the chamber 21 at a location where the fluid 27 will be picked up, even when the fluid 27 is at a relatively low level. In the illustrated embodiment, the inlet tube 23 and the pickup tube 33 are metal and conductive. The electric coiled-wire heating element 25 is positioned transversely in the chamber 21 and is electrically connected at each end to the metal air inlet tube 23 and to the pickup tube 33. The hot coils of the heating element 25 are positioned generally centrally in the chamber 21 at a location where they will not contact the pool of fluid 27, even when the chamber 21 is tipped over.

The spray dispenser 26 is attached under the top cover 22 at a central location where it is positioned over the heating element 25. The spray dispenser 26 provides an angled spray (i.e. a "cone" angle) of about 80 to 90 degrees, such that fluid droplets are spread out relatively evenly on the heating coil portion of the heating element 25. In the illustrated apparatus 20, it has been found that a distance of about 2 to 3 inches from the dispenser 26 to the heating element 25 is good, where the dispenser is a #15 nozzle (i.e. a nozzle capable of outputting 15 gal/hr at 100 psi).

The pump 34 is mounted to top cover 22 and operably connected to the pickup or suction tube 33 and to the dispenser 26. The pump 34 is a standard gear-type pump that operates at a pressure of about 20 psi. It can be driven by a 12v DC motor, or by a 120v AC motor, or by compressed air, or by other pump means known in the art.

A variety of different smoke-producing fluids can be used in the present apparatus 20. The illustrated smoke-producing fluid 27 is a mineral oil that is non-toxic as a fluid and further non-toxic as a smoke. Further, the fluid 27 preferably has a controlled vaporization and burn rate that provides for safe use in the present apparatus.

The outlet opening in the top cover 22 includes an orifice 29 that is about 0.093 inches in diameter, which is optimally at least less than 50% of a diameter of the hose 32. This size restricts the flow of smoke until sufficient density has built up, yet allows sufficient flow of smoke, thus helping to provide a more uniform concentration of smoke in the air. Also, the orifice 29 helps stop or restrict vaporized oil droplets that are "too large" in size from exiting the chamber 21.

The delivery tube 32 is connected at outlet 31 to the outlet nipple of the outlet tube 24 and is flexible so that it can be easily coupled in a use position. The tube 32 is sufficiently large so that the airflow through it is not excessively quick, yet the delivery tube 32 is sufficiently small so that smoke-carrying air travels through the tube 32 with acceptable speed. The illustrated delivery tube 32 has an ID of about ¼ to ⅝ inch, and is about 8 feet long, such that smoke-laden air takes at least several seconds to travel along the tube 32. A mini-tank can also be used to give the "delayed" travel of air.

For optimal heat control and spark reduction, a wire-mesh condenser 30' is positioned at the outlet 31 of the smoke-producing chamber ahead of the delivery tube 32 to better distribute and control smoke in the air, and to reduce oil droplets and heat in the smoke-carrying air. Also, the initial several inches of the delivery tube 32 can be coiled at a location 30 to further provide a condenser-type arrangement. As noted above, a pressure relief valve 46 can be incorporated into the top cover 21, if desired.

A variety of different air supplies can work with the present arrangement. The illustrated air supply 41 can be a mobile compressed air source, bottled air, bottled N2 gas, (or other compressed non-combustible gas), or it can be from a permanent air compressor or other air source.

Figure 2:
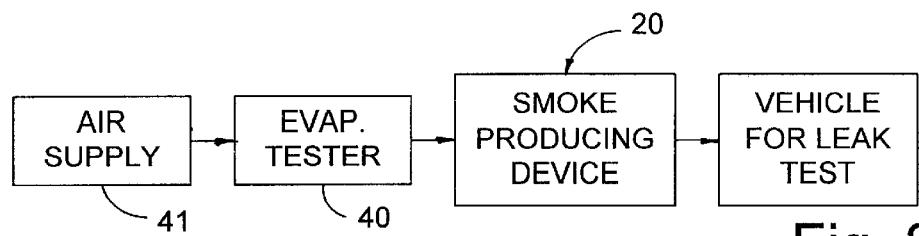
FIG. 2 is a schematic view showing the apparatus of FIG. 1 combined as modular component with an existing emissions tester.
Figure 3:
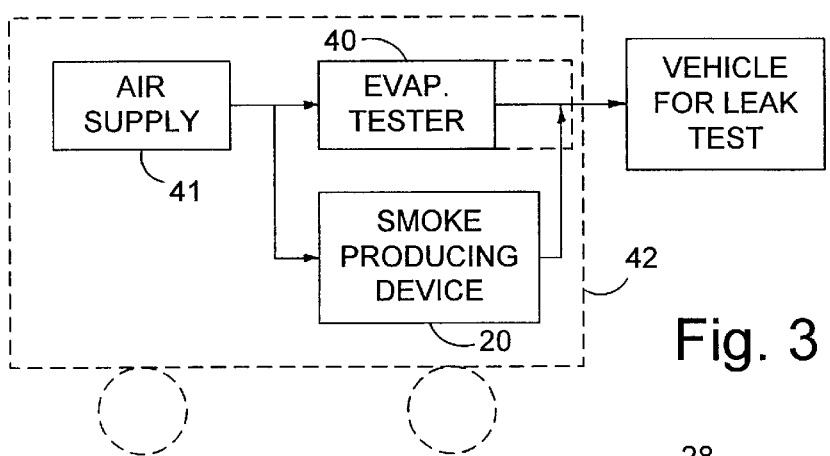
FIG. 3 is a schematic view showing the apparatus of FIG. 1 integrally combined as an integral unit with a pressure sensing emissions tester, in a same mobile cabinet.
Figure 4:
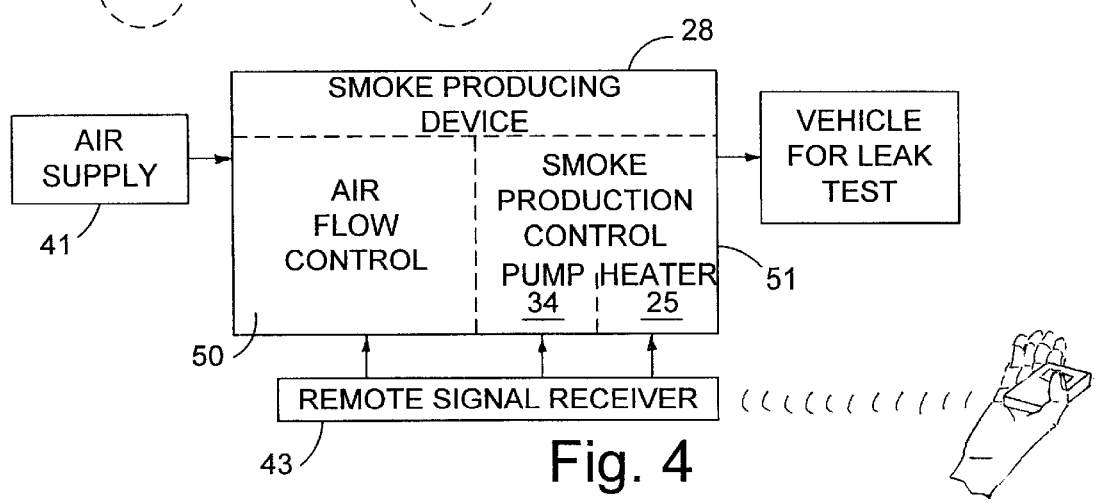
FIG. 4 is a schematic view of an arrangement where the above smoke-producing apparatus is combined with a remote signal sender and receiver operably connected to remotely turn the smoke-producing apparatus on and off

It is contemplated that the control box 28 will include appropriate controls to meet the control needs of the person using apparatus 20. Specifically, it is contemplated that manual controls can be provided (e.g. manual shutoffs for controlling airflow from the supply of air and for controlling the fluid pump), or automated controls can be provided (e.g. computer controlled, electric shutoffs for airflow and for the fluid pump). Alternatively, semi-automatic controls can be provided (e.g. to provide safety shutoffs, over-pressure shutoffs, low-fluid-level shutoffs, and the like). In particular, it is noted that the present apparatus is low cost and produces a very uniform smoke, such that many customers want to incorporate it into their existing leak testing devices. One such arrangement is shown in FIG. 2. In FIG. 2, an existing evaporative emissions tester 40 is coupled to the apparatus 20, with the outlet of the evaporative emissions tester 40 being connected to the air inlet of the apparatus 20. The emissions test apparatus disclosed in U.S. Pat. No. 5,507, 176, issued Apr. 16, 1996, is an example of one such unit, and the entire contents of the same are incorporated in its entirety herein. A common air source 41 can be used for both apparatus 40 and 20. Notably, the apparatus 20 and 40 can be interconnected in a modular arrangement where the apparatus are separate modular units (i.e. FIG. 3), or they can be incorporated into a single apparatus that is supported by a single mobile cabinet 42 (FIG. 2).

In an optimal arrangement, the control box 28 includes separate controls for controlling flow of the fluid 27 onto the heating element for controlling smoke production, and for controlling flow of air for carrying smoke through a delivery line for use. In one variation which has proven to be particularly useful, a receiver 43 is operably connected to the control box 28 for shutting off one or both of the airflow and the fluid flow. A sender 44 is provided to the mechanic conducting the test on a vehicle to be tested. The sender 44 is programmed to communicate with the receiver 43 to turn "on" and "off" the airflow control 50 and the smoke control 51 (i.e. the pump 34 and/or the heater 25). Receivers 43 and senders 44 useful for the present combination are known in the art. For example, such receivers and senders are used in vehicles to lock and unlock vehicle doors, or to open and close garage doors.

In the foregoing description, it will be readily appreciated by persons skilled in the art that modifications may be made to the invention without departing from the concepts disclosed herein. Such modifications are to be considered as included in the following claims, unless these claims, by their language, expressly state otherwise.

The invention claimed is:
1. An apparatus for generating smoke, comprising:
a closed chamber having an air inlet and an air outlet;
an electric heating element positioned transversely in the chamber;

a supply of smoke-producing fluid;

a dispenser positioned over the electric heating element and operably connected to the supply of smoke-producing fluid, the dispenser being configured to spread and drop controlled quantities of the smoke-producing fluid onto the heating element;

an air supply connected to the air inlet;

a conduit connected to the air outlet for communicating air from the air supply mixed with smoke generated by the heating element in the closed chamber to a location for use; and a spark arrester positioned in the air outlet.

2. The apparatus defined in claim 1, wherein one of the air inlet and outlet is metal.

3. The apparatus defined in claim 1, wherein the closed chamber includes a top cover and the dispenser is positioned under and proximate the top cover.

4. The apparatus defined in claim 3, wherein the dispenser is attached to the top cover.

5. The apparatus defined in claim 3, wherein the dispenser sprays at a distribution cone of about 80–90 degrees.

6. The apparatus defined in claim 1, wherein the air inlet and air outlet each include tubes and that are mounted to a top cover of the closed chamber along with the dispenser.

7. The apparatus defined in claim 1, wherein a space from the dispenser to the heating element is about two to three inches.

8. The apparatus defined in claim 1, including a pump for pumping the smoke-producing fluid to the dispenser, and a shutoff control for shutting off at least one of the pump and the heating element.

9. The apparatus defined in claim 8, wherein the shutoff control includes a remote control.

10. An apparatus for generating smoke, comprising:

a closed chamber having an air inlet and an air outlet;

an electric heating element positioned transversely in the chamber;

a supply of smoke-producing fluid;

a dispenser positioned over the electric heating element and operably connected to the supply of smoke-producing fluid, the dispenser being configured to spread and drop controlled quantities of the smoke-producing fluid onto the heating element;

an air supply connected to the air inlet;

a conduit connected to the air outlet for communicating air from the air supply mixed with smoke generated by the heating element in the closed chamber to a location for use, and a suction line extending from a bottom of the closed chamber to a top of the chamber, wherein the suction line is metal, and wherein the heating element includes ends connected to the air inlet and the suction line.

11. The apparatus defined in claim 10, including an automatic shutoff operably connected to the heating element.

12. An apparatus for generating smoke, comprising:

a closed chamber having an air inlet and an air outlet;

an electric heating element positioned transversely in the chamber;

a supply of smoke-producing fluid;

a dispenser positioned over the electric heating element and operably connected to the supply of smoke-producing fluid, the dispenser being configured to spread and drop controlled quantities of the smoke-producing fluid onto the heating element;

an air supply connected to the air inlet;

a conduit connected to the air outlet for communicating air from the air supply mixed with smoke generated by the heating element in the closed chamber to a location for use, wherein the air outlet includes an outlet orifice that is less than about 50% of a diameter of the air outlet.

13. An apparatus for generating smoke, comprising:

a closed chamber having an air inlet and an air outlet;

an electric heating element positioned transversely in the chamber;

a supply of smoke-producing fluid;

a dispenser positioned over the electric heating element and operably connected to the supply of smoke-producing fluid, the dispenser being configured to spread and drop controlled quantities of the smoke-producing fluid onto the heating element;

an air supply connected to the air inlet;

a conduit connected to the air outlet for communicating air from the air supply mixed with smoke generated by the heating element in the closed chamber to a location for use;

an automatic shutoff operably connected to the heating element, and a pump connected to the dispenser and an automatic shutoff operably connected to the pump.

14. The apparatus defined in claim 13, including a suction line extending from a bottom of the closed chamber to a top of the chamber.

15. The apparatus defined in claim 13, including an automatic shutoff operably connected to the air supply.

16. An apparatus for generating smoke, comprising:

a closed chamber having an air inlet and an air outlet;

an electric heating element positioned transversely in the chamber;

a supply of smoke-producing fluid;

a dispenser positioned over the electric heating element and operably connected to the supply of smoke-producing fluid, the dispenser being configured to spread and drop controlled quantities of the smoke-producing fluid onto the heating element;

an air supply connected to the air inlet;

a conduit connected to the air outlet for communicating air from the air supply mixed with smoke generated by the heating element in the closed chamber to a location for use; and a pump for pumping the smoke-producing fluid to the dispenser, and a shutoff control for shutting off at least one of the pump and the heating element;

wherein the shutoff control includes a remote control, and wherein the remote control includes a receiver associated with the chamber and further includes a sender for communicating with the receiver to activate the shutoff control.

17. An apparatus for generating smoke, comprising:

a closed chamber having an air inlet and an air outlet;

an electric heating element positioned transversely in the chamber;

a supply of smoke-producing fluid;

a dispenser positioned over the electric heating element and operably connected to the supply of smoke-producing fluid, the dispenser being configured to spread and drop controlled quantities of the smoke-producing fluid onto the heating element;

an air supply connected to the air inlet;

a conduit connected to the air outlet for communicating air from the air supply mixed with smoke generated by the heating element in the closed chamber to a location for use; and a control for controlling production of smoke and flow of smokeying air, the control including a sender configured to send a radio frequency shutoff signal, and including a receiver configured to receive the radio frequency shutoff signal and to then shut off at least one of the airflow, the smoke-generating fluid, and the heating element.

18. An apparatus for testing for leaks comprising:

a smoke-producing chamber;

a first control for controlling a quantity of smoke generated;

an air supply operably connected to the smoke-producing chamber; and a second control, independent of the first control, for controlling flow of smoke from the smoke-producing chamber.

19. The apparatus defined in claim 18, including a remote control constructed to shut off the first and second controls from a location remote from the apparatus.

20. The apparatus defined in claim 19, wherein the remote control is a wireless control constructed to send signals through the air to the apparatus.

21. An apparatus for testing for leaks comprising:

a smoke-producing device including a control for controlling a quantity of smoke generated and dispensed, the control including a receiver for receiving signals and being constructed to turn off the smoke-producing device upon receiving a shutoff signal; and a remote control sender constructed to send the shutoff signal to the receiver.

22. An apparatus for generating smoke comprising:

a closed chamber having a top cover, and an air inlet tube and an air outlet tube extending through the cover, at least one of the inlet and outlet tubes being conductive;

an electric coiled-wire heating element positioned transversely in the chamber and operably electrically connected to the at least one conductive tube; and a spray dispenser attached to the top cover and positioned over the heating element and operably connected to a supply of smoke-producing fluid, the dispenser being configured to spread and drop controlled quantities of the smoke-producing fluid onto the heating element.

23. The apparatus defined in claim 22, including an air supply connected to the air inlet; and a conduit connected to the air outlet for communicating air from the air supply mixed with smoke generated by the heating element in the closed chamber to a location for use.

24. The apparatus defined in claim 22, wherein the top cover is sealingly attached to the chamber but constructed to break away when a predetermined over-pressurization force is generated in the chamber.

25. An apparatus for generating smoke, comprising:

a closed chamber having an air inlet and an air outlet;

an electric heating element positioned transversely in the chamber;

a supply of smoke-producing fluid;

a dispenser positioned over the electric heating element and operably connected to the supply of smoke-producing fluid, the dispenser being configured to spread and drop controlled quantities of the smoke-producing fluid onto the heating element;

an air supply connected to the air inlet; and a conduit connected to the air outlet for communicating air from the air supply mixed with smoke generated by the heating element in the closed chamber to a location for use;

wherein the smoke-producing chamber includes sidewalls and a top cover sealingly attached to the sidewalls, the top cover being constructed to break away when a predetermined over-pressurization force is generated in the chamber.

26. An apparatus comprising:

a chamber adapted to hold smoke-producing fluid in a bottom thereof;

a heating element positioned in the chamber including contacts for operating the heating element to produce heat;

a pump including a suction line with an end positioned in the bottom for pumping the smoke-producing fluid onto the heating element; and the chamber including a sidewall and a top cover sealingly attached to the sidewall to close the chamber, one of the top cover and the sidewall being constructed to release when a predetermined over-pressurization force is generated in the chamber.

27. The apparatus defined in claim 26, wherein the top cover is constructed to break away from the sidewall when the predetermined over-pressurization force is generated in the chamber.

* * * * *